(12) United States Patent
Paczkowski

(10) Patent No.: US 6,315,159 B1
(45) Date of Patent: Nov. 13, 2001

(54) IMPACT DAMPENING SYSTEM FOR VENDING MACHINE CHUTE

(75) Inventor: Thomas S. Paczkowski, Wildwood, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 0 days.

(21) Appl. No.: 09/425,523

(22) Filed: Oct. 22, 1999

(51) Int. Cl.⁷ ..................................................... B65G 59/00
(52) U.S. Cl. ...................................... 221/312 R; 193/25 A
(58) Field of Search .................................. 221/312 R, 67, 221/241, 197, 92; 193/25 R, 25 A, 25 S, 2 R

(56) References Cited

U.S. PATENT DOCUMENTS 5,848,724 * 12/1998 Uzzle et al. ...................... 221/312 R
6,041,906 * 3/2000 Howard ................................ 193/2 R

FOREIGN PATENT DOCUMENTS

403182993 * 8/1991 (JP) .................................. 221/312 R

* cited by examiner

Primary Examiner—Kenneth W. Noland
(74) Attorney, Agent, or Firm—Cohn, Powell & Hind

(57) ABSTRACT

This impact dampening system for a vending machine chute includes a resilient sheet disposed above a fixed support and a cushioning arrangement disposed between the resilient sheet and the fixed support. In one embodiment, a sheet metal chute provides the fixed support and a sheet plastic chute having a similar configuration to the sheet metal chute provides the resilient sheet, and foam pads between the two chutes providing the cushioning arrangement for containers received by the plastic sheet. In another embodiment, a sheet plastic chute only is used which is suspended by hangers or attached by brackets to the vending machine and may be provided with a diverter to direct containers away from direct travel to the vending machine access port.

21 Claims, 9 Drawing Sheets

IMPACT DAMPENING SYSTEM FOR VENDING MACHINE CHUTE

BACKGROUND OF THE INVENTION

This invention relates generally to a package delivery chute and in particular to a vending machine chute having an impact dampening system for dampening the impact of dispensed carbonated soft drink packages as they are received by the chute en route to a customer access port of the vending machine.

Prior art vending machines for dispensing soft drinks were almost universally provided with chutes below the vending apparatus intended to receive carbonated soft drinks in 12 ounce metal cans. Sheet metal chutes used in vending machines are common in the prior art and are quite adequate to direct the metal containers from the dispensing location to the customer without creating a foam-over problem when the can is opened by a customer. Sometimes the chute is lined with a low-friction plastic to facilitate delivery.

The foam-over problem resulting from the use of relatively soft plastic bottle packages used in conjunction with a conventional sheet metal delivery chute has caused annoyance to customers and is exacerbated when the chute is not only rigidly mounted but also has deflecting surfaces intended to direct the package into the area of the access port in a somewhat random travel path. The first impact occurs as the package falls from the dispensing mechanism under gravity directly onto the rigid chute, secondary impacts occur depending on the travel path of the package to the access port and in addition, packages are sometimes subject to a tertiary effect from impacting the vending machine door in which the access port is located.

The present invention overcomes these and other disadvantages in a manner not revealed in the known prior art.

SUMMARY OF THE INVENTION

This package delivery chute incorporates a dampening system to overcome problems which occur when soft plastic packages such as 20 ounce bottles, are agitated during travel of the packages from the initial point of impact onto the chute to the customer access port. The dampening system is effective to reduce or eliminate foam-over when the product is opened by a customer.

The present system provides a delivery chute which is mounted to receive the initial impact of plastic packages, such as 20 ounce bottles, and is arranged to direct the package toward the access port with minimum secondary impact, the delivery chute being mounted in the vending machine in conjunction with an impact dampening system which absorbs impact forces caused primarily by gravitational forces and deflecting forces on the package.

The impact dampening system is created by providing a resilient plastic chute and a cushioning means between the plastic chute and an underlying metal chute, the cushioning means being disposed at locations between the two chutes which preferably have conforming configurations. Additionally, cushioning means may be provided between the plastic chute and the door of the vending machine.

This impact dampening system for vending machine containers, in its broad aspect comprises resilient means providing an impact surface receiving containers dispensed from a vending machine; and load transfer means for transferring load applied to said impact surface to said vending machine.

It is an aspect of this invention to provide that said load transfer means includes a fixed support means attached to said vending machine; and cushioning means is disposed between said impact surface and said fixed support means.

It is another aspect of this invention that the resilient means includes a resilient plastic panel; the fixed support includes a sheet metal panel; and the cushioning means includes a cushioning pad arrangement disposed between said resilient plastic panel and said sheet metal panel.

It is yet another aspect of this invention to provide an impact dampening system for a vending machine having a rear wall, and a front door having a dispensing port, the system comprising a sheet metal chute including a downwardly inclined panel having an upper rear portion operatively attached to the vending machine, and a front portion; a sheet plastic chute including a downwardly inclined panel disposed above the downwardly inclined panel of the metal chute, a front portion disposed adjacent the dispensing opening and deflecting means on each side of the dispensing port for directing containers toward the dispensing port; and cushioning means between the sheet plastic chute and the sheet metal chute for transferring impact received by the sheet plastic chute to the sheet metal chute.

It is still another aspect of this invention to provide that said cushioning means includes cushioning pad means disposed between said inclined panel of said plastic chute and said inclined panel of said sheet metal chute.

It is another aspect of this invention to provide that said sheet metal chute includes wing panels; and said sheet plastic chute includes wing panels providing said deflecting means, said wing panels being disposed above said wing panels of said sheet metal chute.

It is an aspect of this invention to provide that said resilient means includes cushioning means disposed between said wing panels of said sheet plastic chute and said wing panels of said sheet metal chute.

It is yet another aspect of this invention to provide that the angle of inclination of said downwardly inclined panel of said sheet plastic chute is less than the angle of inclination of said downwardly inclined panel of said sheet metal chute to create a wedge-shaped space between said panels.

It is still another aspect of this invention to provide that said sheet plastic chute includes upwardly extending flanges on each side of said chute; and a cushioning means is disposed between said flanges and the vending machine door.

It is another aspect of this invention to provide a vending machine including a rear wall, opposed side walls, a front door having a customer access port and a floor; a sheet metal chute including a downwardly inclined panel attached at its upper end to the rear wall and attached at its lower end to the floor and including integrally formed deflecting wing panels at each side of the inclined panel; a sheet plastic chute disposed above the sheet metal chute and including a downwardly inclined panel attached at its upper end to the upper end of the inclined chute of the sheet metal panel and including integrally formed deflecting wing panels at each side of the inclined panel; the chutes being spaced from each other at the lower end; and an impact dampening means to absorb impact load received by the sheet plastic chute from containers dispensed onto said sheet plastic chute, said dampening means including a first dampening means provided by the resilience of the plastic panel initially impacted by the containers and a second dampening means provided by cushioning means disposed between the chutes.

It is yet another aspect of the invention to provide that said plastic chute includes upright front flanges at each side spaced from the vending machine door when its in closed position, and said impact dampening means includes cushioning means disposed between said flanges and said door to provide a third dampening means to further absorb impact load received by the sheet plastic chute from containers dispensed onto said sheet plastic chute.

In another embodiment, it is an aspect of this invention to provide that the resilient means includes a non-rigid, flexible plastic sheet providing a single chute.

In another aspect of the invention the load transfer means includes suspension means extending between said plastic sheet and said vending machine which may be provided by hanger springs. In another aspect, the load transfer means is provided by brackets attached to said vending machine.

It is yet another aspect of the invention to provide that the flexible sheet includes a diverter for deflecting containers away from the point of impact, toward the wing panels, and initially away from the access port, the diverter having opposed inclined surfaces diverging on a downward direction.

In still another aspect of the invention, the diverter has a longitudinal axis which is offset from the access port.

This impact dampening system is relatively inexpensive to manufacture and install and highly effective for its intended purpose.

DESCRIPTION OF THE PREFERRED EMBODIMENT

Figure 1:
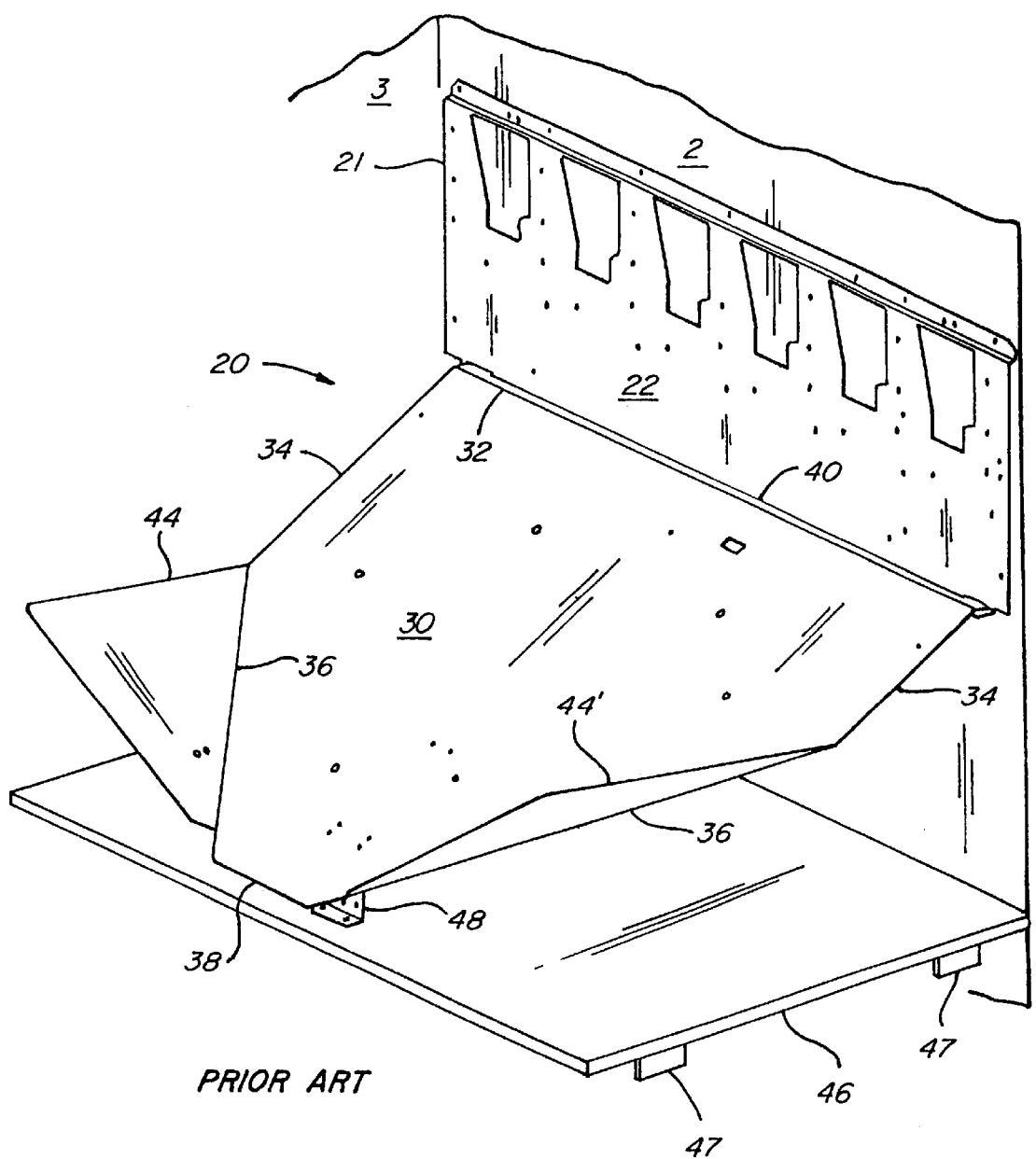
FIG. 1. is a perspective view of a prior art system.

Referring now by reference numerals to the drawings and first to FIGS. 3–7 it will be understood that in the embodiment shown, an impact dampening system 10 is mounted in a vending machine 1 having a rear wall 2, opposed side walls 3 and a door 4 having an access port 5. The impact dampening system disclosed herein may be used in conjunction with a conventional sheet metal chute. Accordingly, the prior art conventional chute is discussed below.

Figure 2:
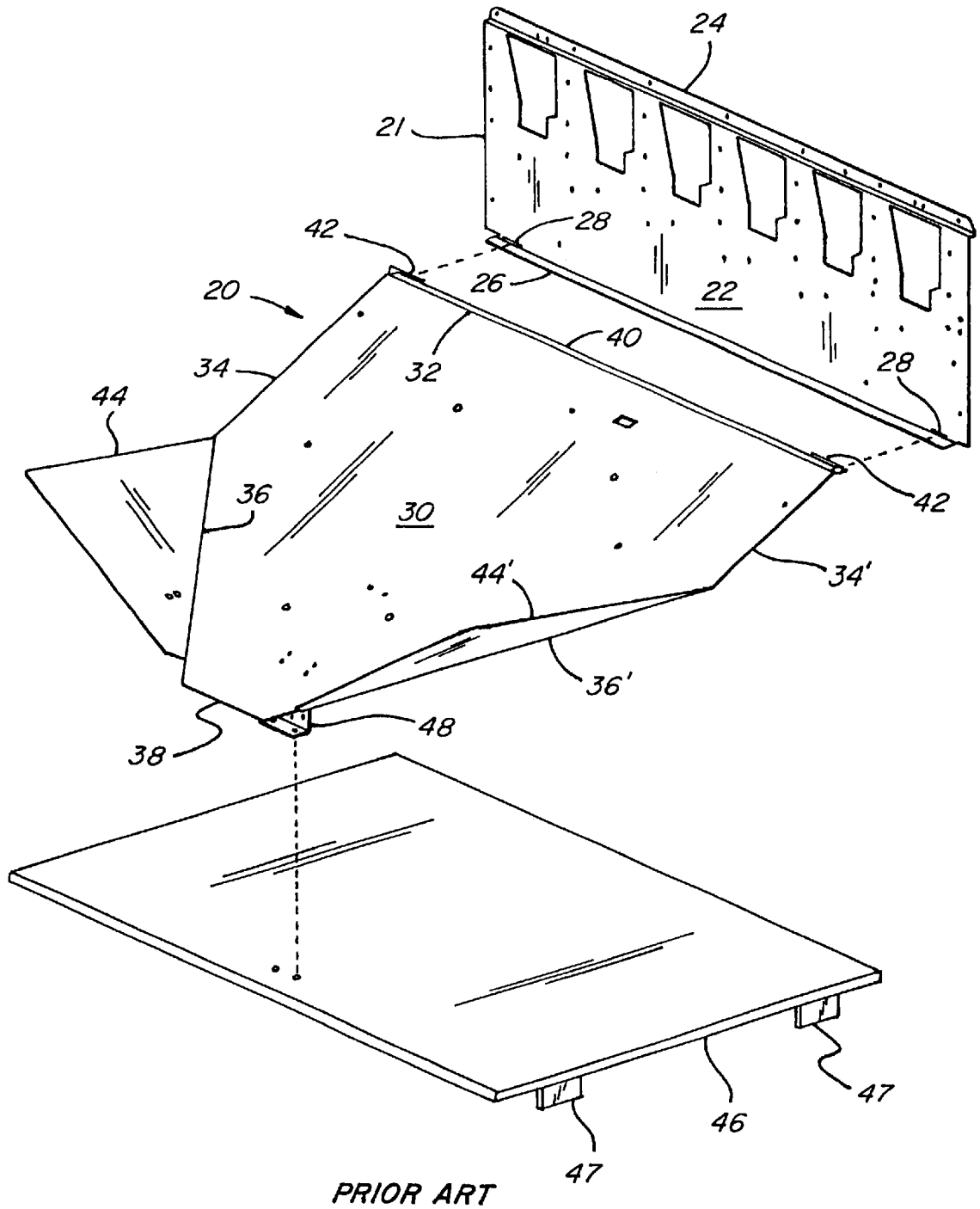
FIG. 2 is an exploded perspective view of the system of FIG. 1.

As shown, FIGS. 1 and 2 the prior art sheet metal delivery chute 20 include a sheet metal back plate 21 which is mounted to a vending machine rear wall 2. The back plate 21 includes a generally U-shaped portion 22 which is clear of the rear wall 2 and is attached to the wall 2 by upper and lower flanges 24 and 26, as by fasteners. The delivery chute 20 includes a downwardly inclined, generally polygonal, inclined panel 30 defined by an upper margin 32, opposed side margins 34, 34' opposed inclined bend lines 36, 36' and a front margin 38. At the upper margin 32, a horizontal flange 40 is provided having end mounting tabs 42 received by associated mounting slots 28 provided at the lower end of back plate U-shaped portion 22. The sheet metal delivery chute 20 also includes opposed wing panels 44, 44' inclined upwardly from the bend lines 36, 36' and unitarily formed with the inclined panel 30. Wing panels 44, 44' provide deflectors for the containers C dispensed from the vending machine racks (not shown).

The inclined panel 30 is mounted to a floor panel 46 by means of a two-part, generally Z-shaped adjustable mounting bracket 48, as by fasteners (not shown). The floor panel 46 is fixedly attached to the rear wall 2 and side walls 3 of the vending machine 1 in a manner well-known in the prior air, for example by angle brackets 47.

In the embodiment of the prior art metal chute 20 described above, the inclined panel 30 is shown as being asymmetrical with the portion of the chute on the left hand side having a wing panel 44 smaller than the wing panel 44' on the right hand side. It will be understood however that the asymmetry is simply to accommodate the structural arrangement of the interior components of the vending machine 1. The inclined panel 30 could, with a different arrangement of interior components be symmetrical, with the wing panels being of equal size, or asymmetrical with the wing panel 44 being larger than the wing panel 44'.

In the embodiment of the impact dampening system 10, which will now be described, it is to be understood that, an improved sheet plastic chute 40, which constitutes a resilient means, cooperates with and utilizes the structure of the prior art sheet metal chute 20 described above, which constitutes a fixed support means. Accordingly, the same parts are given the same reference numerals.

Figure 3:
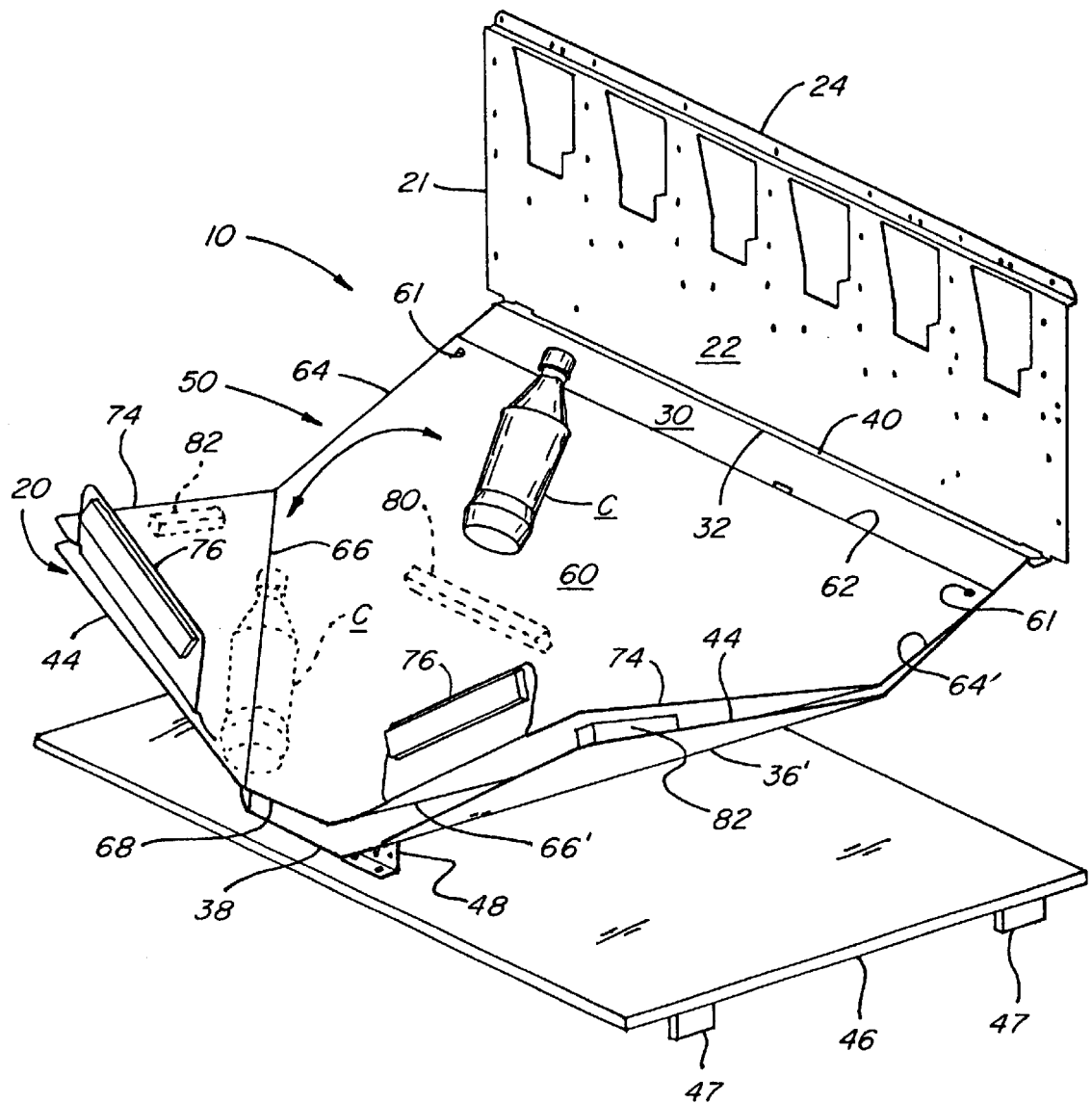
FIG. 3 is a perspective view of an improved resilient impact system.
Figure 4:
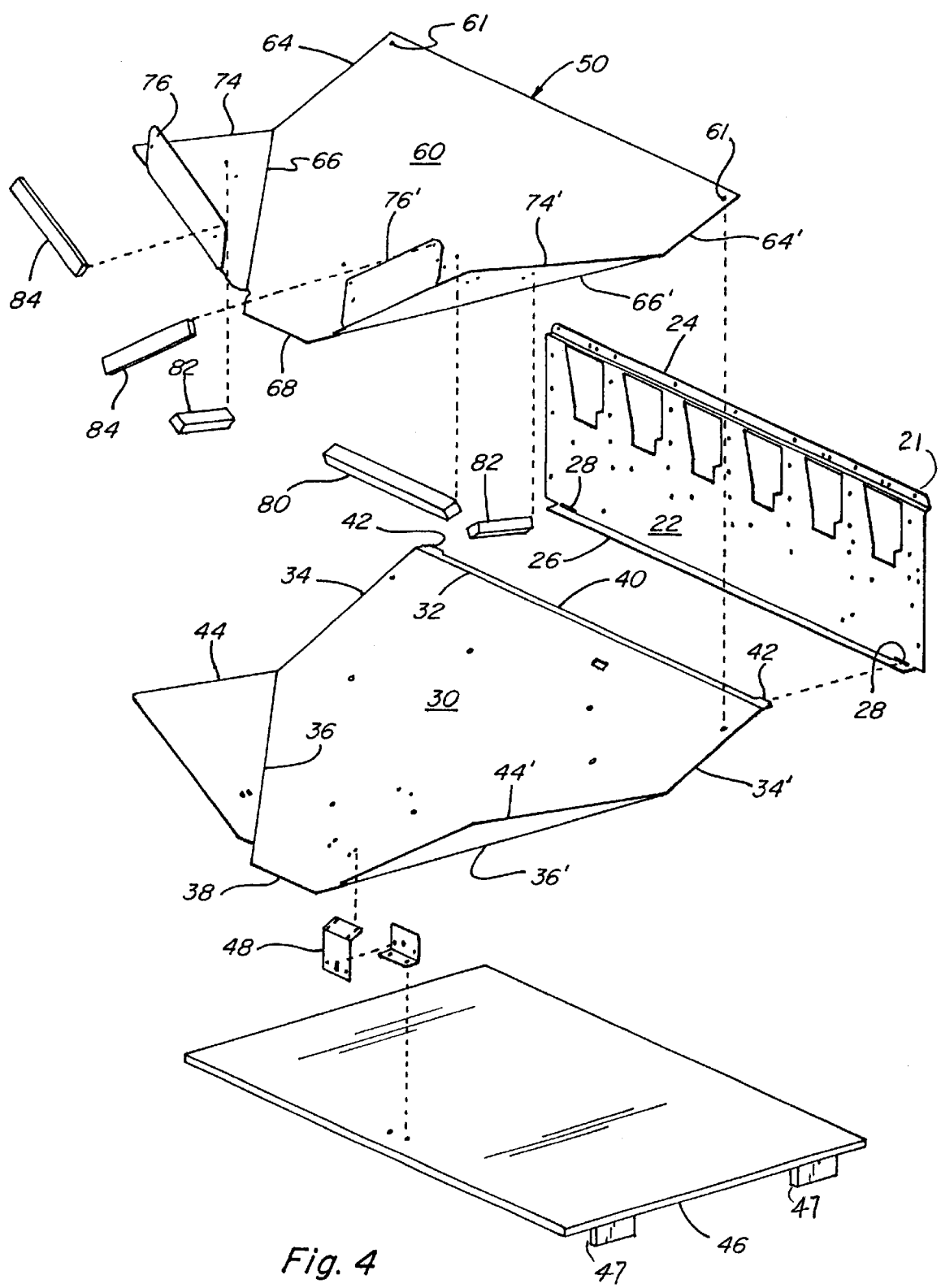
FIG. 4 is an exploded perspective view of the improved system of FIG. 3.
Figure 5:
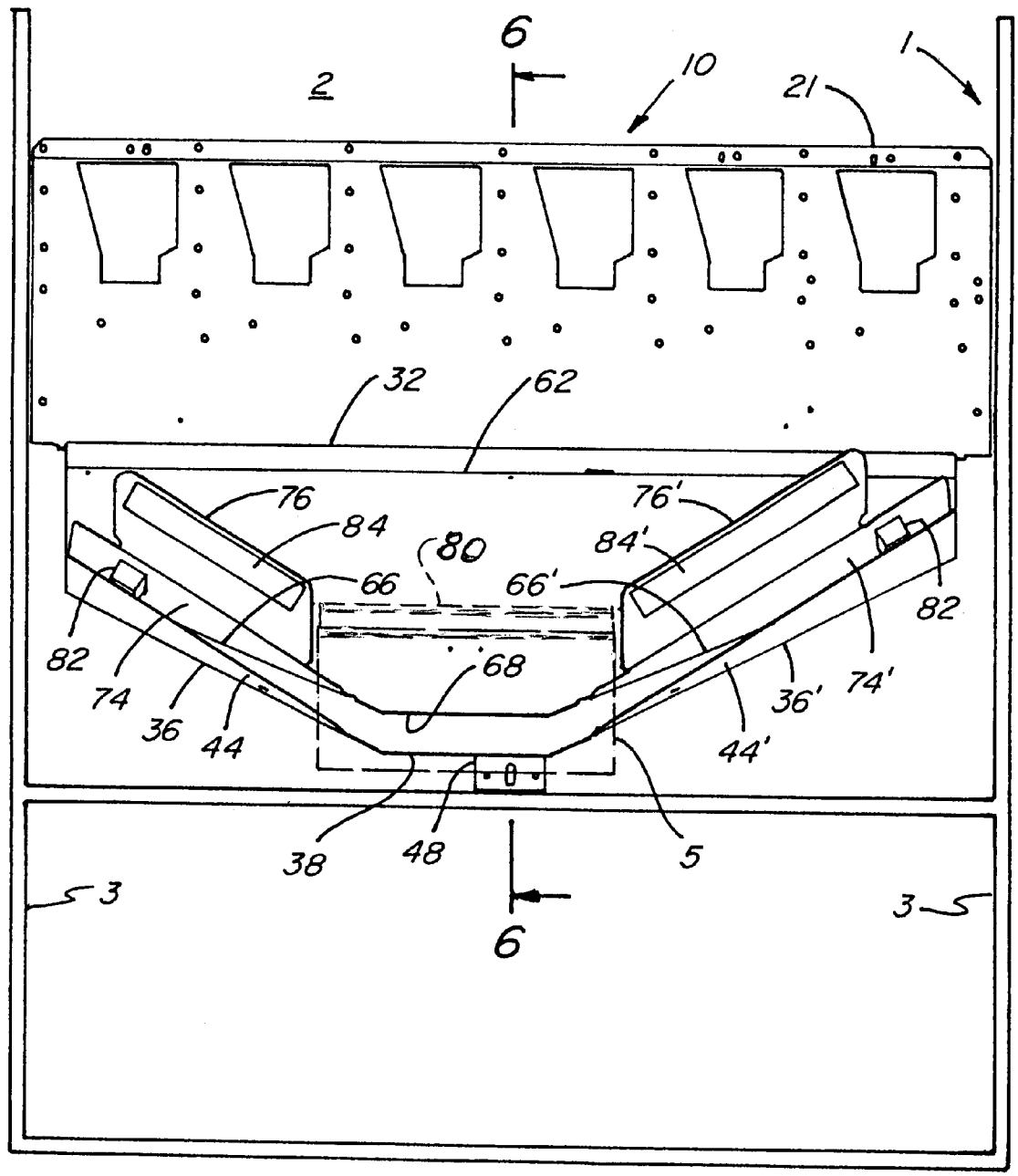
FIG. 5 is a front view of the improved system showing the outline of a vending machine.
Figure 6:
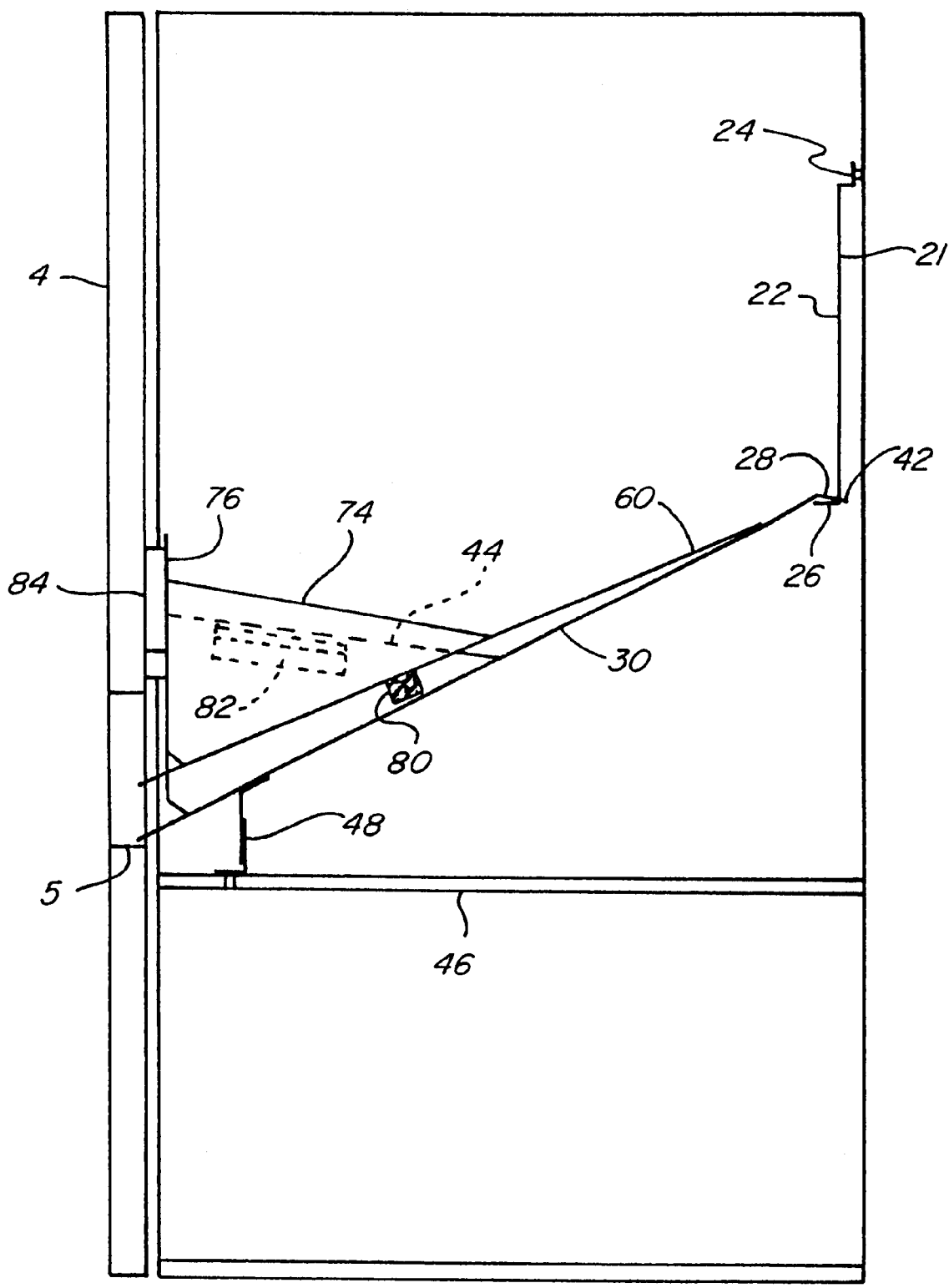
FIG. 6 is a cross-sectional view taken on Line 6—6 of FIG. 5.
Figure 7:
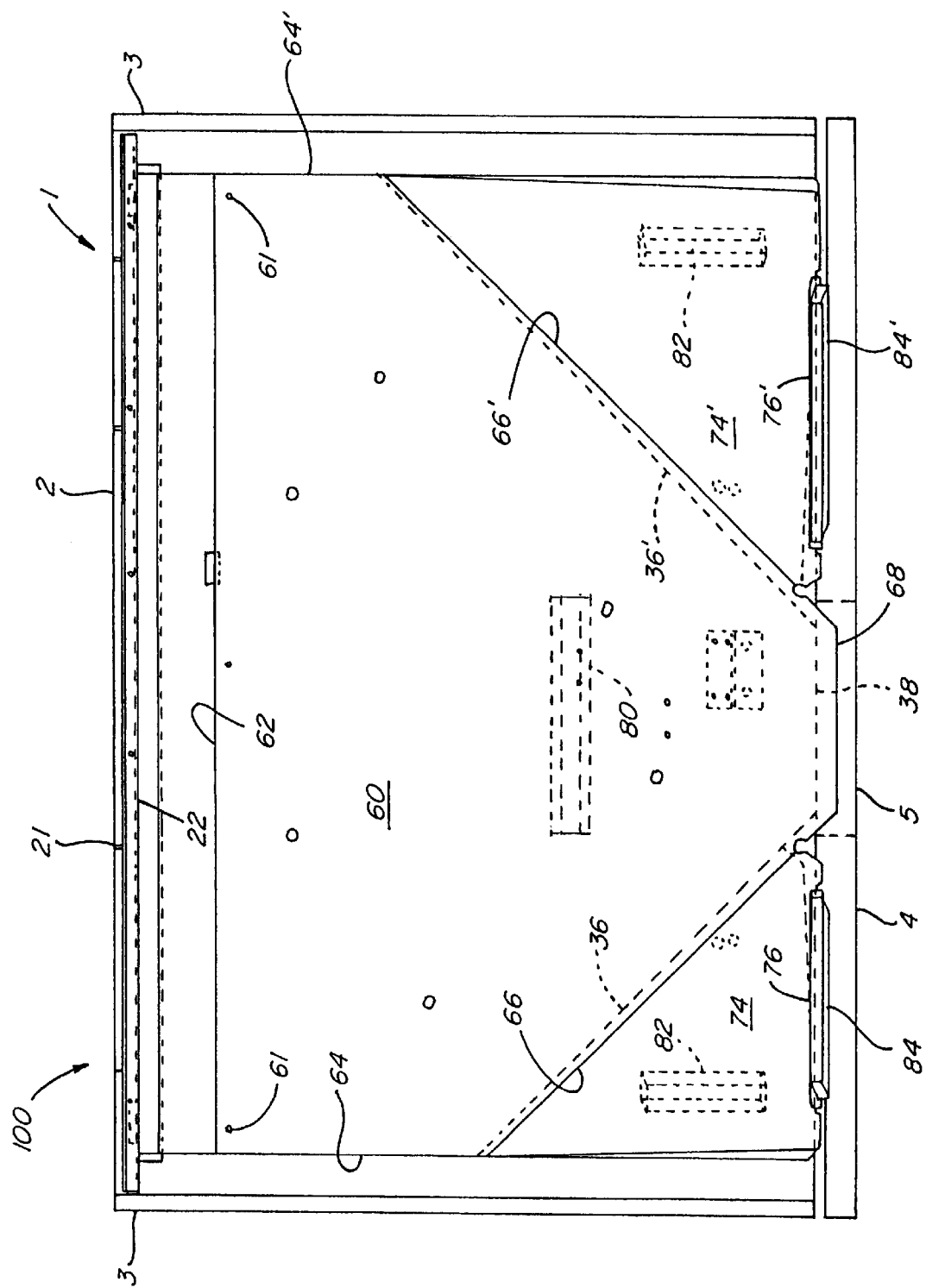
FIG. 7 is a plan view of FIG. 5.

Referring now to the improved structure as shown in FIGS. 3–4 in particular, the sheet plastic chute 50 includes a polygonal inclined panel 60, which has a upper margin 62 parallel to but spaced from the upper margin 32 of the underlying inclined panel 30. The inclined plastic panel 60 also includes opposed side margins 64, 64'; opposed bend lines 66, 66'; and a front margin 68. The inclined panel 60 is attached by fasteners 61 adjacent its upper margin 62 to the sheet metal inclined panel 30 in parallel spaced relation from the back plate 21. As with the sheet metal chute 20, the sheet plastic chute 50 includes opposed wing panels 74, 74'; inclined upwardly from the bend lines 66, 66'; and unitarily formed with the inclined panel 60. Wing panels 74, 74'; provide deflectors for the containers C dispensed from the vending machine racks (not shown). Distinguishing from the underlying metal wing panels 44, 44'; the plastic wing panels 74, 74'; include vertical flanges 76, 76'; which are integrally formed with the plastic wing panels 74, 74'.

In the embodiment shown, except for the upper margins 32 and 62, respectively, the sheet plastic chute 50 is, in plan, generally in register with the sheet metal chute 20. As discussed above, the overlying chute 50 is attached to the underlying chute 20 by fasteners 61. In addition, the sheet plastic chute 60 is spaced from the underlying chute 20 by a central cushioning pad 80, which is sandwiched between the inclined panels 30 and 60 and attached, as by adhesive to the inclined panel 60, and by side cushioning pads 82, which are sandwiched between the wing panels 44, 44' and 74, 74' and attached, as by adhesive, to the wing panels 74, 74'. Opposed cushioning pads 84 are also provided, which are attached to the vertical flanges 76, 76' so that they engage the front access door 4 of the vending machine and provide additional cushioning means for the sheet plastic chute 50.

The impact dampening system 10 is installed in the vending machine by first attaching the sheet metal chute 20 in the usual way, that is by mounting the back plate 21 to the vending machine rear wall 2; attaching the floor panel 46 to the rear wall 2 and side walls 3 of the vending machine and mounting the inclined panel 30 to the back plate 21 and to the floor panel 46 by inserting tabs 42 into back plate slots 28 and by means of 9. mounting bracket 48, respectively.

The sheet plastic chute 50 is effectively attached to the sheet metal chute 20 by a simple fastening system, which consists essentially of the two fasteners 61 at the upper edge of the inclined sheet 30. In addition, the sheet plastic chute 50 is supported in spaced relation from the sheet metal chute 20 by cushioning pads 80 and 82. Finally, the plastic chute 60 is cushioned from the vending machine door by virtue of pads 84.

When a container, such as a 20 ounce plastic bottle, is dispensed from the vending machine rack, it initially strikes the resilient sheet plastic panel 60. The impact, which is absorbed to some extent by the plastic panel material, is transferred to the sheet metal panel 30 from the plastic panel 60 through the shock-absorbing cushioning pad 80, and from the resilient sheet plastic wing panels 64 and the sheet metal wing panels 44 by the cushioning pads 82. In addition, at least part of the impact is absorbed by the cushioning pads 84, 84' between the wing panel flanges 76, 76' and the vending machine access door 4, when the wing panel deflectors are stuck during the forward and downward motion of the containers. In the embodiment shown, the sheet plastic chute is preferably formed from polyolefin; the sheet metal is preferably of zinc-coated steel and the cushioning pads are preferably formed from cellular foam plastic material.

Figure 8:
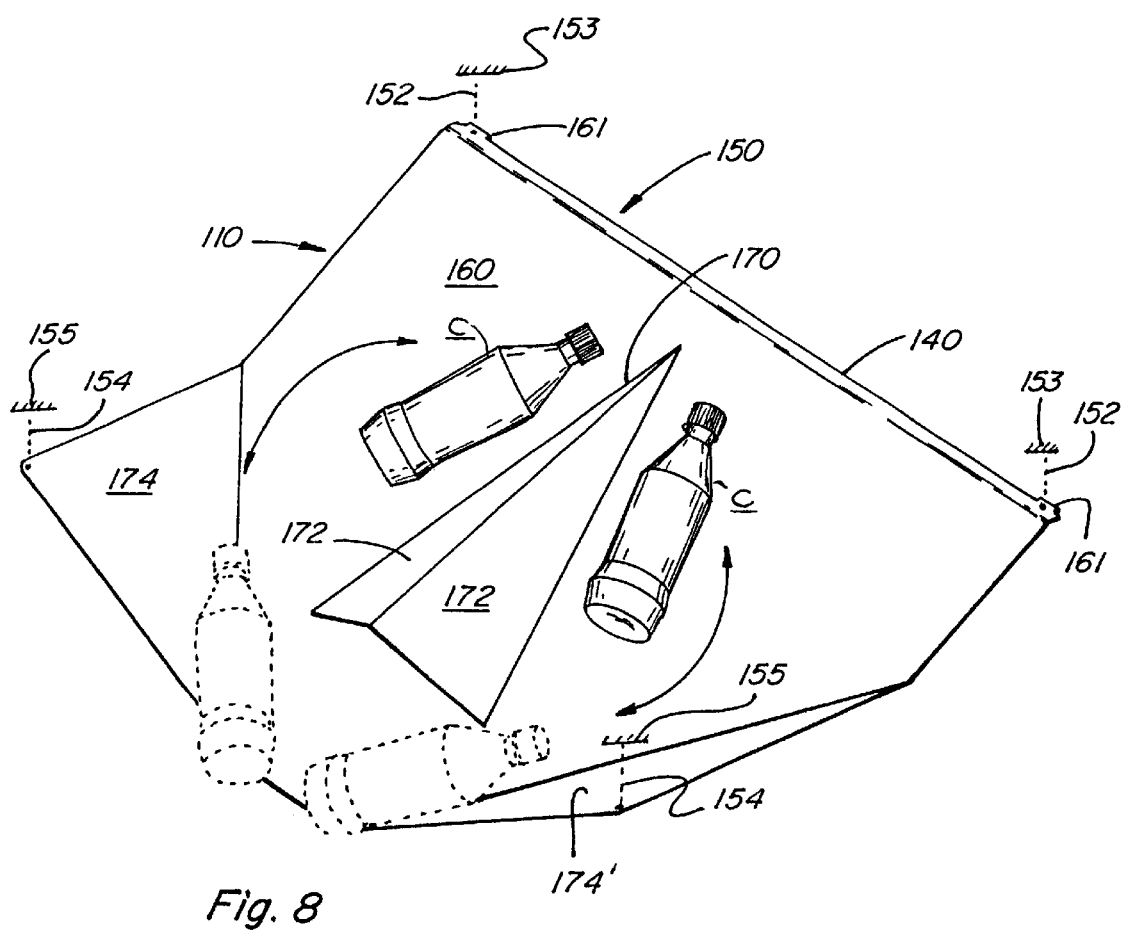
FIG. 8 is a perspective view of a modified impact dampening system.
Figure 9:
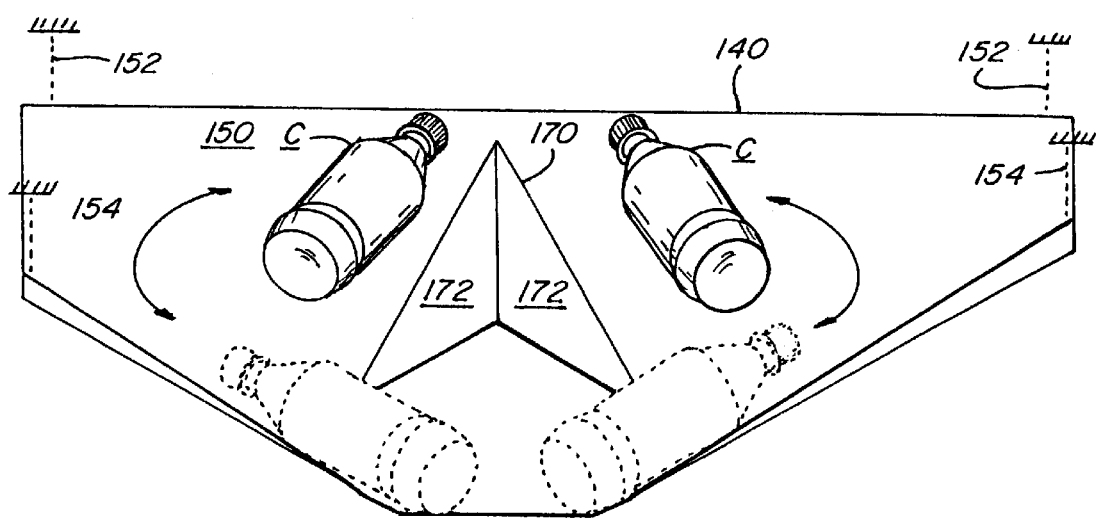
FIG. 9 is a front view of the modified system of FIG. 8.

An alternative structure, shown diagrammatically in FIGS. 8 and 9, shows a modified impact dampening system. In the modified system, in lieu of using a cushioning arrangement between a metal chute and a plastic chute, a single non-rigid flexible plastic chute, of polyolefin or similar material is used, and held in place by a hanger system.

The plastic chute itself is similar to that shown by numeral 50 in FIGS. 3–7 and, where appropriate, the same reference numerals are used together with a prefix numeral 1.

As shown in FIGS. 8 and 9, a plastic chute 150 is suspended by rear and front hanger elements 152 and 154, which may be springs, from supports 153 and 155 respectively at the lower end of the vending rack (not shown). The rear elements 152 are attached to opposed ends 161 of the upper flange 140 of the inclined panel 160, and the front elements 154 are attached to the corners of the wing panels 174 and 174'. Also distinguishing from the embodiment illustrated in FIGS. 3–7, the embodiment illustrated in FIGS. 8 and 9 includes a plastic chute diverter 170. The diverter controls the deflection of the container C by diverting the container toward another area of the plastic chute 150, namely, the wing panels 174 and 174', depending on whether the containers fall from the left hand side of the vending rack or the right hand side. To this end, the preferred configuration of the diverter includes inclined diverging triangular panels 172 which direct the containers C in the desired direction.

The suspended flexible delivery chute 150 constitutes a resilient means and absorbs the initial impact of the carbonated soft drink plastic bottles and diverts the product to the wing panel area of the chute in a controlled manner, said wing panels being capable of absorbing secondary impact.

The chute diverter 170 eliminates the impact of a container C on to rigid components within the vending machine 1 such as the inside of the door 4 or the edge of the customer access port 5. By this diverter arrangement, product velocity resulting from the initial impact deflection and the inclination of the chute inclined panel 160, is minimized as the product enters the access port. The reduction in impact and velocity diminishes the foam-over problem associated with 20 ounce carbonated plastic bottle containers.

Figure 10:
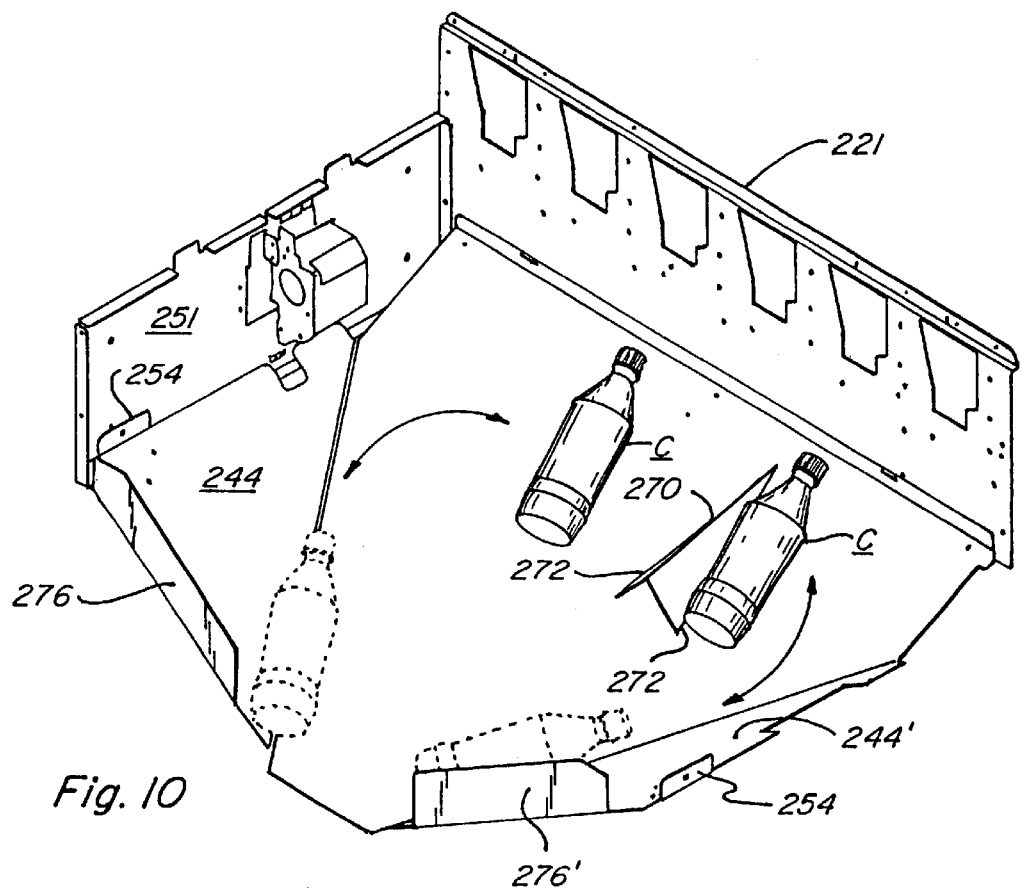
FIG. 10 is a perspective view of another modified system.
Figure 11:
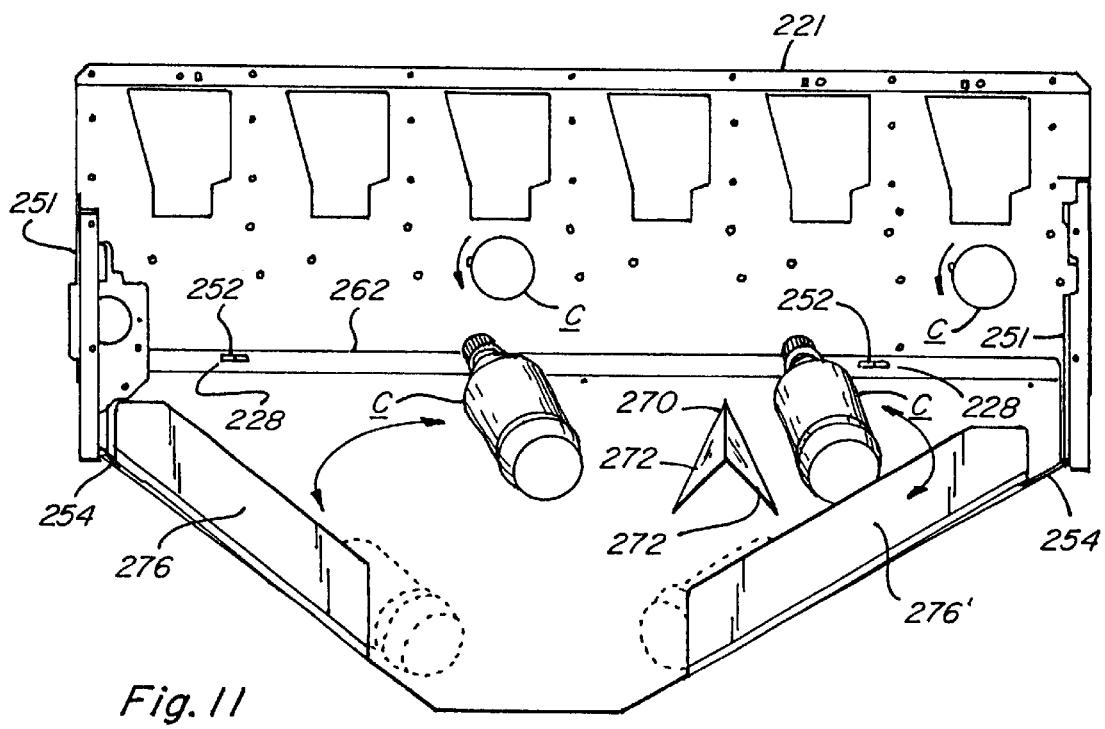
FIG. 11 is a front view of the modified system of FIG. 10.

Another embodiment is shown in FIGS. 10 and 11. This embodiment is similar to the embodiment discussed above in FIGS. 8 and 9 and similar parts are given similar numbers with the addition of a prefix numeral 2.

The non-rigid flexible plastic chute 250 is attached at its upper end flange 262 to the back plate 121 as by tabs 252 interfitting slots 228, and at its front end to side panels 251 by brackets 254 which form an integral part of the wing panels 244 and 244'.

As shown in FIG. 11, the cylindrical product C released from the dispensing rack may have a spin induced by the dispensing mechanism so that it rotates about its longitudinal axis. If the induced spin is counterclockwise then on primary impact the product will tend to roll the left as well as down the inclined plane. When it does so it will roll into the wing panel where the change of inclination will cause it to lose velocity and move down the channel created by the wing panel toward the access port.

In some instances, because of the layout of components in the vending machine which may effect the configuration of the wing panel, it may be desirable to offset the location of the diverter 270 to avoid the deflecting of the product toward the access poll rather than preferably to a wing panel 176 where it would lose velocity.

The diverter 270 is smaller but of generally the same configuration as the diverter 170 of FIGS. 8 and 9 having triangular side panels 272. Distinguishing from the diverter 170, diverter 270 is offset to the right hand side of the plastic chute 250 which tends to direct containers C to a specific location. In addition, each wing panel 244 and 244' includes upstanding flanges 276 and 276' which protect the door 4 of the vending machine 1 from being impacted by the containers.

It will be understood that the provision of wing panels provides a means of causing the container to lose velocity by a non-abrupt slow down. A diverter is helpful in directing the product into a wing panel taking into consideration induced spin and the angle of inclination of the center panel and the wing panels. If a diverter is desirable to avoid directing the product into the area of the access port where it may strike the door at the sides of the access port, the location of the diverter in a particular vending machine model is usually determined empirically.

While 20 ounce bottle containers tend to be subject to foam over more than cans, the same principles may be applied to lessen the possibility of foam over in cans also.

In view of the above, it will be understood that various aspects and features of the invention are achieved and other advantageous results are attained. While a preferred embodiment of the invention has been shown and described, it will be clear to those skilled in the art that various modifications may be made without departure of the invention in its broader aspects.

I claim as my invention.

1. An impact dampening system for a vending machine having a rear wall, and a front door having a dispensing port, the system comprising:

(a) a sheet metal chute including a downwardly inclined panel having an upper rear portion operatively attached to the vending machine, and a front portion;

(b) a sheet plastic chute including a downwardly inclined panel disposed above the downwardly inclined panel of the metal chute, a front portion disposed adjacent the dispensing opening and deflecting means on each side of the dispensing port for directing containers toward the dispensing port; and (c) cushioning means between the sheet plastic chute and the sheet metal chute for transferring impact received by the sheet plastic chute to the sheet metal chute.

2. An impact dampening system as defined in claim 1, in which:

(d) said cushioning means includes cushioning pad means disposed between said inclined panel of said plastic chute and said inclined panel of said sheet metal chute.

3. An impact dampening system as defined in claim 1, in which:

(d) said sheet metal chute includes wing panels; and (e) said sheet plastic chute includes wing panels providing said deflecting means, said wing panels being disposed above said wing panels of said sheet metal chute.

4. An impact dampening system as defined in claim 2, in which:

(f) said cushioning means includes cushioning pad means disposed between said wing panels of said sheet plastic chute and said wing panels of said sheet metal chute.

5. An impact dampening system as defined in claim 1, in which:

(d) said downwardly inclined panel of said sheet plastic chute includes an upper portion attached to the upper portion of said inclined panel of said sheet metal chute; and said front portion of said inclined panel of said sheet plastic chute is spaced from said front portion of said sheet metal chute; and (e) said resilient means includes cushioning means disposed said inclined panel of said plastic chute and said inclined panel of said sheet metal chute.

6. An impact dampening system as defined in claim 1, in which:

(d) the angle of inclination of said downwardly inclined panel of said sheet plastic chute is less than the angle of inclination of said downwardly inclined panel of said sheet metal chute to create a wedge-shaped space between said panels.

7. An impact dampening system as defined in claim 1, in which:

(d) said sheet plastic chute includes upwardly extending flanges on each side of said chute; and (e) a cushioning means is disposed between said flanges and the vending machine door.

8. A vending machine comprising:

(a) a rear wall, opposed side walls, a front door having a customer access port and a floor;

(b) a sheet metal chute including a downwardly inclined panel attached at its upper end to the rear wall and attached at its lower end to the floor and including integrally formed deflecting wing panels at each side of the inclined panel;

(c) a sheet plastic chute disposed above the sheet metal chute and including a downwardly inclined panel attached at its upper end to the upper end of the inclined chute of the sheet metal panel and including integrally formed deflecting wing panels at each side of the inclined panel; the chutes being spaced from each other at the lower end; and (d) an impact dampening means to absorb impact load received by the sheet plastic chute from containers dispensed onto said sheet plastic chute, said dampening means including a first dampening means provided by the resilience of the plastic panel initially impacted by the containers and a second dampening means provided by cushioning means disposed between the chutes.

9. A vending machine as defined in claim 8, in which:

(e) the dampening means includes a plurality of foam cushioning pads.

10. A vending machine as defined in claim 8, in which:

(e) said sheet plastic chute includes upright front flanges at each side spaced from the vending machine door when its in closed position, and (f) said impact dampening means includes cushioning means disposed between said flanges and said door to provide a third dampening means to further absorb impact load received by the sheet plastic chute from containers dispensed onto said sheet plastic chute.

11. An impact dampening system as defined in claim 8, in which:

(c) the resilient means includes a non-rigid, flexible plastic sheet providing a single chute.

12. An impact dampening system as defined in claim 11, in which:

(d) the load transfer means includes suspension means extending between said plastic sheet and said vending machine.

13. An impact dampening system as defined in claim 12, in which:

(e) the suspension means includes a plurality of springs providing hangers.

14. An impact dampening system as defined in claim 11, in which:

(d) the load transfer means includes bracket means operatively attached between said plastic sheet and said vending machine.

15. An impact dampening system as defined in claim 11, in which:

(d) said non-rigid flexible sheet includes a downwardly inclined panel having integrally formed side wing panels and a diverter for deflecting containers away from the point of impact toward the wing panels and away from an access port.

16. An impact dampening system as defined in claim 15, in which:

(e) said diverter includes opposed inclined surfaces operatively attached together and diverging in a downward direction.

17. An impact dampening system as defined in 16, in which:

(e) the diverter has a longitudinal axis which is offset from the access port.

18. An impact dampening system for vending machine containers comprising:

(a) resilient means providing an impact surface receiving containers dispensed from a vending machine;

(b) load transfer means for transferring load applied to said impact surface to said vending machine;

(c) said load transfer means including a fixed support means attached to said vending machine; and (d) cushioning means disposed between said impact surface and said fixed support means.

19. An impact dampening system for vending machine containers comprising:
   (a) resilient means providing an impact surface receiving containers dispensed from a vending machine;
   (b) load transfer means for transferring load applied to said impact surface to said vending machine;
   (c) said load transfer means including a fixed support means attached to said vending machine;
   (d) cushioning means disposed between said impact surface and said fixed support means;
   (e) said resilient means including a resilient plastic panel;
   (f) said fixed support including a sheet metal panel; and
   (g) said cushioning means including a cushioning pad means disposed between said resilient plastic panel and said sheet metal panel.

20. An impact dampening system for vending machine containers comprising:
   (a) resilient means providing an impact surface receiving containers dispensed from a vending machine; and
   (b) load transfer means for transferring load applied to said impact surface to said vending machine, including cushioning means disposed between said resilient means and said vending machine.

21. An impact dampening system for vending machine containers comprising:
   (a) resilient means including a resilient plastic sheet providing an impact surface receiving containers dispensed from a vending machine; and
   (b) load transfer means for transferring load applied to said impact surface to said vending machine including cushioning means disposed between said resilient means and said vending machine.

* * * * *